Inventors:
Herbert A. McAninch
and Robert L. Erwin
By: Frank C. Parker
Atty.

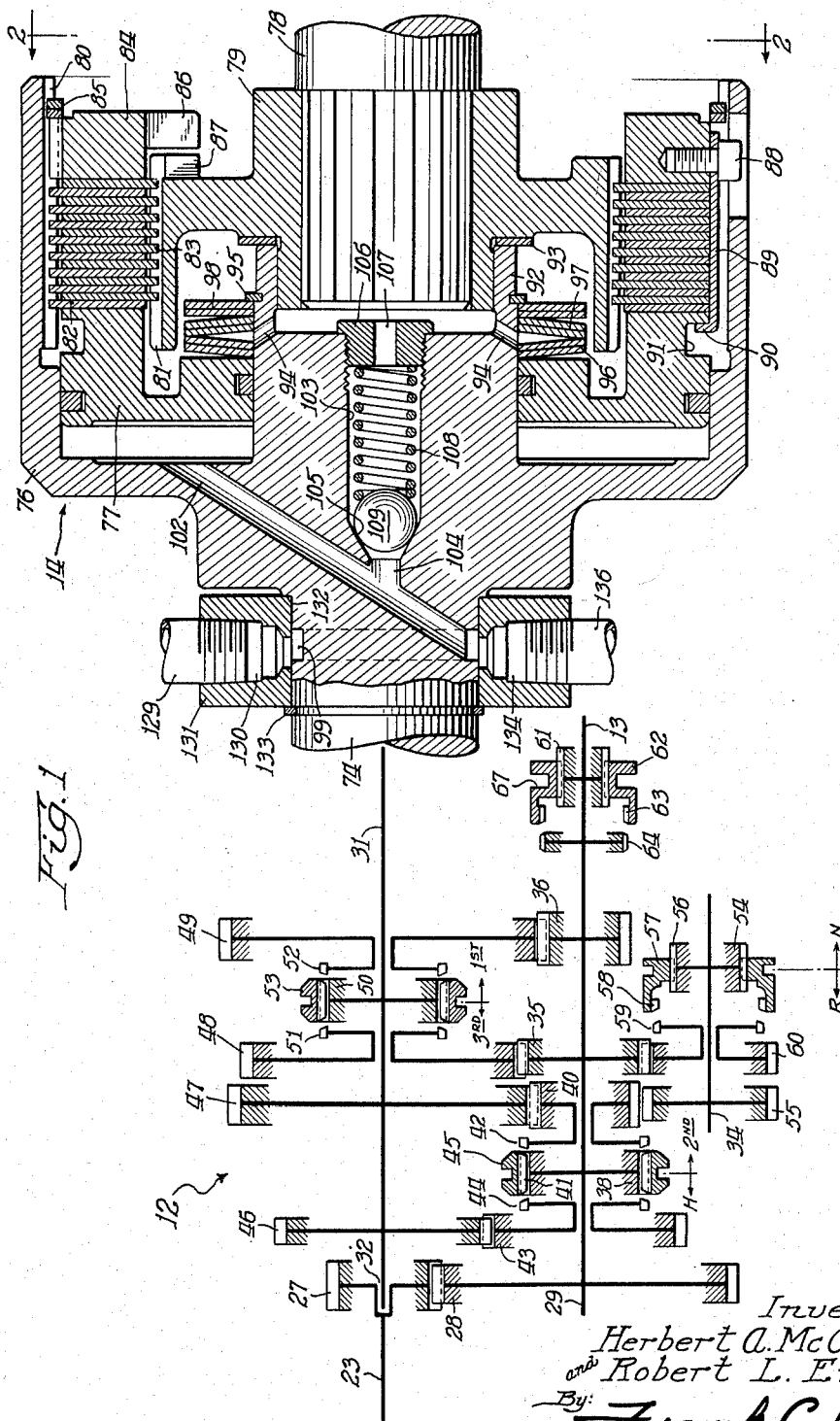

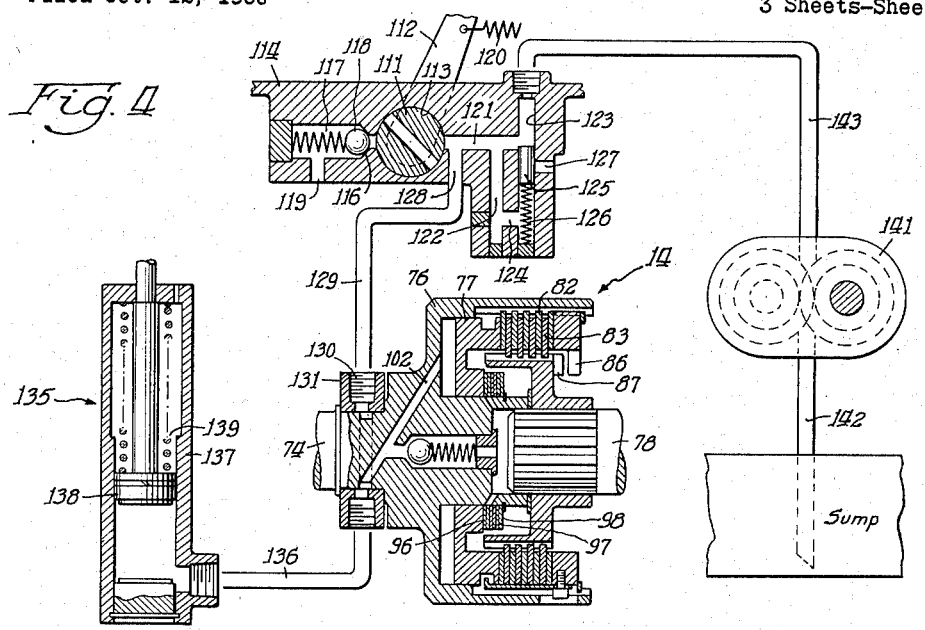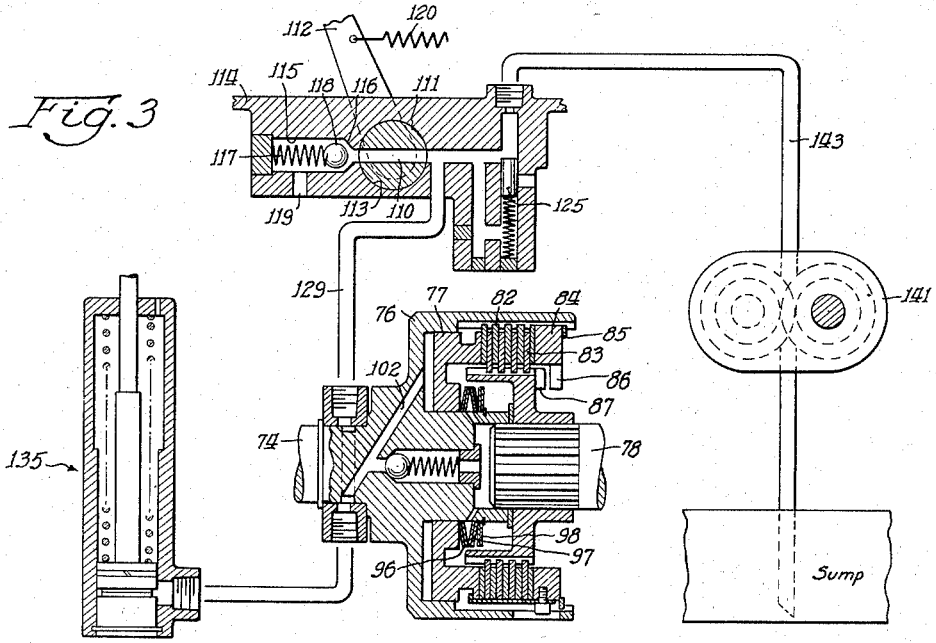

United States Patent Office 2,907,428
Patented Oct. 6, 1959

2,907,428

CLUTCH AND CONTROLS THEREFOR

Robert L. Erwin, Royal Oak, Mich., and Herbert A. McAninch, Auburn, Ind., assignors to Ford Motor Company, Dearborn, Mich., a corporation of Delaware, and Borg-Warner Corporation, Chicago, Ill., a corporation of Illinois Application October 12, 1953, Serial No. 385,512

18 Claims. (Cl. 192—48)

This invention relates in general to power transmitting mechanism, and more particularly to fluid pressure actuated clutch mechanisms useful for controlling the connection between the change speed transmission and driven wheels of a vehicle, such as a tractor or truck.

It will be apparent to those skilled in the art that in such a vehicle considerable torque is transmitted from the transmission driven shaft to the driving wheels, and it is, therefore, highly desirable that any clutch disposed between these elements be capable of transmitting these substantial torque loads over considerable periods of time. It is also highly desirable in such vehicles to provide for braking the vehicle driving wheels when the vehicle motor is stopped. Furthermore, inasmuch as such vehicles are frequently provided with power take-off shafts for providing power to operate an auxiliary implement—for example, a corn husker—associated with the vehicle, it is highly desirable to provide means for interrupting the connection between the driving wheels of the vehicle and the transmission while continuing operation of the power take-off shaft.

It is, therefore, the general object of the present invention to provide for all of the desirable features enumerated in the immediately preceding paragraph.

A more specific object of the present invention is to provide fluid pressure operated clutch structure suitable for disposition between the change speed transmission and driving wheels of an automotive vehicle.

Another object of this invention is the provision of an additional clutching means associated with a fluid pressure operated clutch mechanism disposed between the transmission and driving wheels of an automotive vehicle which clutch means is of such nature as to connect these elements when the flow of fluid under pressure for engaging the fluid pressure operated clutch drops below a predetermined minimum value.

Another object of the invention is the provision of a device in accordance with the preceding object in which the friction clutch is automatically disengaged before the additional clutching means become effective.

Another object is the provision of a fluid pressure operated clutch structure in which the fluid pressure system is provided with fluid pressure relief valve means for controlling the operation of the clutch engaging motor and for limiting the pressure applied to the clutch operating motor.

A further object is to provide a fluid pressure operated system incorporating a structure comprising friction and positive clutches, the structure having a first position in which the friction clutch is disengaged and the positive clutch is engaged, a second position wherein both clutches are disengaged and a third position wherein the friction clutch is engaged and the positive clutch is disengaged.

Another object of the invention is the provision of a device in accordance with the preceding object in which the clutch structure can be placed in any of its positions by varying the fluid pressure applied to the clutch engaging motor.

A further object of the invention is the provision of a mechanism in accordance with the two immediately preceding paragraphs in which a manually operated device is provided for varying the pressure on the clutch motor.

Still another object is the provision of a fluid pressure operated clutch mechanism incorporating biasing means permitting predetermined movement of the clutch operating motor when the fluid pressure attains a first level, and which permits a further predetermined movement of the clutch motor when the pressure attains a second level.

Still another object of the present invention is the provision of a manually controlled fluid pressure system in accordance with the preceding objects and having a fluid pressure accumulator for effecting gradual engagement of the friction clutch disclosed herein.

Still another object is the provision of a device in accordance with the preceding objects in which fluid is directed on to the friction clutch plates to dissipate heat generated by friction therebetween.

The foregoing and other objects of the present invention will become apparent from the following detailed description when read in conjunction with the accompanying drawings wherein:

Figure 1 is a view schematically illustrating a change speed transmission and illustrating in section the clutch of the present invention;

Figure 3 is a view partially schematic and partially in cross section, showing the clutch structure and fluid pressure system of the present invention in which the clutch is shown in the same condition as in Figure 1;

Figure 4 is a view similar to Figure 3, except that parts are shown in a different condition.

Figure 5:
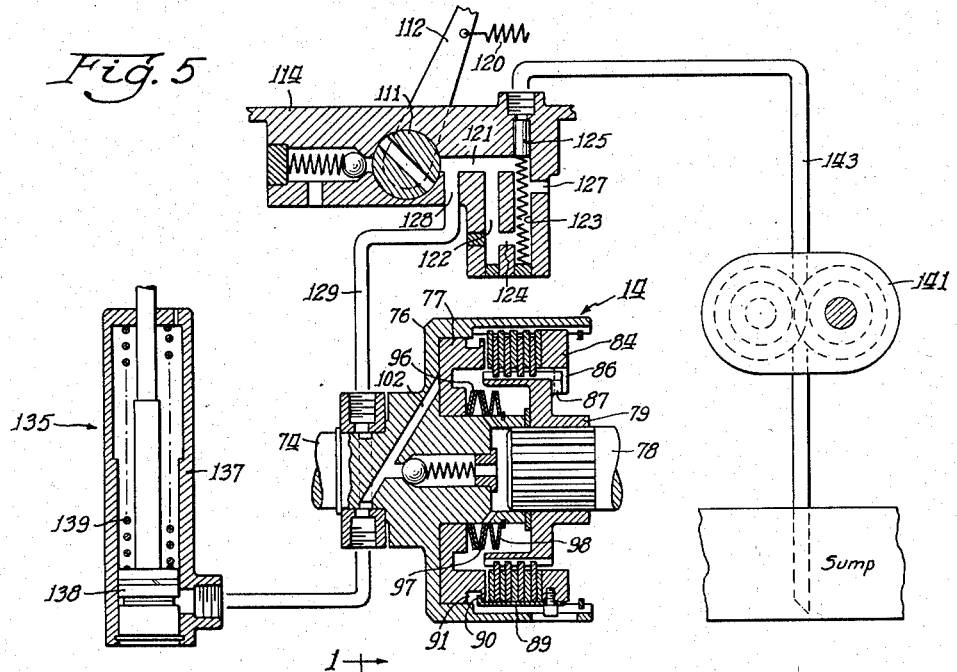
Figure 5 is a view similar to Figures 3 and 4, except that certain parts are shown in still different conditions.
Figure 2:
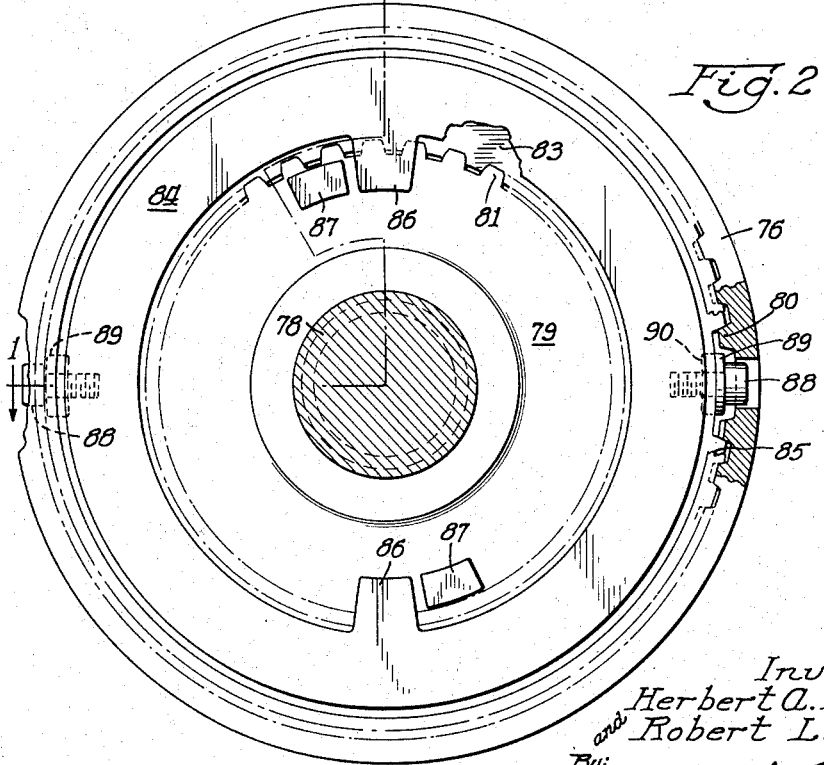
Figure 2 is a view partially in section taken along the plane of line 2—2 of Figure 1.

In these drawings, the change speed mechanism is shown schematically. A more detailed description of this speed change mechanism may be found in a co-pending application of Herbert A. McAninch and Bernard Tharpe, Ser. No. 336,248, filed February 11, 1953, and entitled, "Transmission."

With reference to the drawings, wherein like reference numerals in the different views identify identical parts, there is illustrated a conventional change speed transmission mechanism 12 adapted for connection to a vehicle driving engine by a main clutch, neither of which is illustrated. Associated with the mechanism 12, as shown in Figure 1, is a power take-off shaft 13, and clutch means 14 disposed between the transmission 12 and a differential gearing (not shown) adapted to drive the driving wheels of an automotive vehicle such as a tractor or truck. A shaft 23, connected to the vehicle engine through the main clutch, has an integral gear 27 on its rearward extremity, adapted to continuously mesh with another gear 28 splined on a countershaft 29 which is rotatably mounted in suitable bearings.

A transmission driven shaft 31 is provided which is piloted at 32 within the end of shaft 23, shaft 31 being rotatably mounted in suitable bearings in the transmission housing. Also mounted for rotative movement by the transmission housing is a second countershaft 34 for providing reverse drive between the shafts 23 and 31 as will subsequently be explained.

Formed integrally on the countershaft 29 are gears 35 and 36, and splined to the countershaft 29 is a clutch hub 38. The countershaft 29 is also provided with a gear 40 which is rotatable thereon, the gear 40 being provided with clutch teeth 42. Rotatable with respect to the clutch hub 38 is a gear 43 provided with clutch teeth 44. A shiftable clutch collar 45, which may be controlled manually in any well known manner, is provided with internal clutch teeth 41 which mesh with suitable clutch teeth formed on the hub 38, and which are adapted to slide into clutching engagement with either the clutch teeth 44 or the clutch teeth 42, to respectively connect either the gear 43 or the gear 40 to the countershaft 29.

The transmission driven shaft 31 is provided with two gears, 46 and 47, which are splined thereon and which respectively mesh with gears 43 and 40. The transmission driven shaft 31 also carries two gears 48 and 49 rotatable thereon and which, respectively, mesh with gears 35 and 36 on the countershaft 29. A clutch hub 50 is splined to the driven shaft 31 and has external clutch teeth thereon of the same pitch diameter as clutch teeth 51 and 52, respectively, formed on gears 48 and 49. A clutch collar 53 continuously meshes with the external clutch teeth on the hub 50 and is movable manually into engagement with either of the sets of clutch teeth 51 or 52 to respectively connect the gear 48 or the gear 49 to the shaft 31.

The countershaft 34 has a gear 55 integrally formed thereon, which gear is adapted to mesh continuously with the gear 47 on the driven shaft 31. A clutch hub 54, is provided with longitudinally extended splines 56 for receiving a longitudinally reciprocal clutch collar 57 formed with internal clutch teeth 58 which are adapted to mesh with external clutch teeth 59 formed on a gear 60 rotatable about the countershaft 34. When the collar 57 is moved to the left, in the view of Figure 1, sufficiently to effect engagement between the teeth 58 and 59, the gears 55 and 60 are rotatable in unison in order to complete a reverse drive between the drive shaft 23 and the driven shaft 31.

The change speed mechanism 12 provides four forward drives and one reverse drive from the shaft 23 to the shaft 31. Low speed forward drive between the shafts 23 and 31 is established by moving the clutch collar 53 to the right into clutching engagement with the clutch teeth 52 and a low speed power train is thus established, which extends through the meshing gears 27 and 28, through countershaft 29, through meshing gears 36 and 49 and through the clutch collar 53 and hub 50 to the shaft 31.

Second forward speed drive from the shaft 23 to the shaft 31 is established by moving the clutch collar 45 to the right into clutching engagement with the teeth 42 whereupon a drive is established from the drive shaft 23, through the meshing gears 27 and 28, through the countershaft 29 and the clutch hub 38 and through the gears 40 and 47 to the shaft 31.

Third forward speed drive from the shaft 23 to the shaft 31 is established by moving the clutch collar 53 to the left into clutching engagement with the teeth 51. This drive proceeds from the shaft 23, through the meshing gears 27 and 28, through the countershaft 29, through the gears 35 and 48 and through clutch collar 53 and hub 50 to the driven shaft 31.

High speed forward drive is established by moving the clutch collar 45 to the left into clutching engagement with the teeth 44 to establish a drive from the shaft 23 through the gears 27 and 28, through the countershaft 29, clutch hub 38 and collar 45, through intermeshing gears 43 and 46 to the driven shaft 31.

Reverse drive through the transmission is established by moving the clutch collar 57 to the left to bring its teeth 58 into clutching engagement with the clutch teeth 59 while clutch collars 45 and 53 occupy their neutral positions as shown in Figure 1. The drive thus established extends from the shaft 23 through the gears 27 and 28, through gears 35 and 60, through clutch collar 57 and sleeve shaft 54, and through meshing gears 55 and 47 to the driven shaft 31. It will be noted that during reverse drive, the gears 48 and 49 are driven forwardly by the rotating countershaft gears 35 and 36 but since the clutch collar 53 occupies its neutral position at this time, these gears merely idle about the driven shaft 31.

Power take-off shaft 13 is rotatably mounted in the transmission casing (not shown) and extends rearwardly of the vehicle for connection to an auxiliary implement, such as a corn husker or the like. The shaft 13 is provided at its forward end with longitudinally extending splines 61 on which is mounted a reciprocable clutch collar 62. The clutch collar 62 is provided with internal clutch teeth 63 adapted to engage external clutch teeth 64 formed on a clutch collar splined to the countershaft 29. The clutch collar 62 is provided with an annular groove 67 for receiving a shift fork (not shown).

The driven shaft 31 of the transmission 12 is drivingly connected to a shaft 74 by any suitable means, such as a collar splined to both shafts 31 and 74. The shaft 74 extends rearwardly from the transmission 12 and is formed with an integral bell shaped housing 76 in which is disposed an annular piston 77. A driven clutch shaft 78 is provided which has an annular member 79 splined thereto disposed concentrically within the bell-shaped housing 76. Housing 76 is provided with a plurality of internal splines 80, and annular member 79 is provided with a plurality of external splines 81 for respectively receiving driving and driven friction clutch discs 82 and 83. Discs 82 and 83 are peripherally notched for receiving the splines 80 and 81, respectively, and are accordingly capable of reciprocation longitudinally, but are held fixed arcuately with respect to the members 76 and 79.

Also splined to the bell-shaped housing 76 is a reaction plate 84 capable of longitudinal movement, the rearward limit of which is determined by a stop ring 85 suitably disposed within an annular notch formed within the housing 76. Formed in diametrically opposite positions on reaction plate 84 are a pair of clutch teeth 86, which under certain conditions, to be explained, cooperate with a second pair of teeth 87 formed at diametrically opposite positions on the driven annular member 79. Secured to reaction member 84 by suitable bolts 88 are a pair of diametrically disposed members 89, of generally L shape, having fingers 90 which project into an annular groove 91 in piston 77.

The bell-shaped housing 76 has an inner, integral annular member 92 which, together with the exterior portion of housing 76 forms a cylinder for receiving the annular piston 77. As shown in Figure 1, a thrust washer 93 is interposed between members 79 and 92 and extending through member 92 are a plurality of apertures 94.

Fixedly mounted on the member 92 is a stop ring 95 which provides an abutment, and between the piston 77 and said abutment are disposed a plurality of pairs (96, 97 and 98) of frusto conical spring washers or Belleville washers, which operate to bias piston 77 into abutment with the housing 76, as shown in Figure 5 which illustrates the position of these washers in the normal disengaged condition of the friction clutch.

The assembly of Belleville washers, as used in the present invention, comprises a first pair 96, both members of this pair having their outer peripheries bent toward the right, as shown in Figure 5; adjacent the pair 96 is a second pair of Belleville washers 97, both members of this pair having their outer peripheries bent toward the left, as shown in Figure 5; adjacent the pair 97 is a third pair of Belleville washers 98, the innermost washer of this pair being bent toward the right, while the outermost washer of this pair 98 is bent toward the left, as shown in Figure 5. All of the Belleville washers are approximately of equal size, and normally take the form illustrated in Figure 5, but may be compressed to a flattened or collapsed form as shown in Figure 4. As will be readily apparent to those skilled in the art, the assembly of Belleville washers will act substantially as two adjacent springs.

As will be seen from Figure 1, the shaft 74 is provided with an annular groove 99. Communicating with this groove 99 is an elongated aperture 102, also in communication with the annular cylinder formed in the housing 76. The shaft 74 is also provided with an axially extending opening 103, and this opening is in communication with the aperture 102 by means of a short, axially extending opening 104 and a valve seat 105. The opening 103 is internally threaded on its right end, from the view of Figure 1, and received therein is an adjusting bolt 106 which is formed with a central passage 107 therethrough. Disposed in abutment with the bolt 106 is one end of a spring 108, the opposite end of which engages a ball valve 109 and biases it against the valve seat 105. When fluid under pressure increases sufficiently to overcome the bias of spring 108, the ball 109 moves from its seat 105 and allows fluid to escape through the opening 107. This fluid may then pass through the openings 94 and over the friction clutch discs 82 and 83, and thereby aid in dissipating the heat generated as a result of the friction between these discs. The fluid then is returned through suitable means to the bottom of the transmission casing. This feature is fully explained and claimed in the aforementioned co-pending application of McAninch and Tharpe.

Suitable means are provided for controlling the supply of fluid to the clutch actuating piston 77, and this means comprises a spool valve 111, having an opening 110 extending therethrough. Manually operable means comprising a selector lever 112 is provided for operating the valve and a spring 120 is provided which biases the lever 112 and the valve 111 toward the position indicated in Figure 4. The valve 111 is rotatably mounted within an opening 113 in a valve block 114 adapted to be mounted on the side of the transmission casing by suitable means. The block 114 has formed therein an opening 115 which communicates with the opening 113 through a valve seat portion 116. Within the opening 115 there is disposed a spring 117 which biases a ball valve 118 against the valve seat 116. A suitable bleed port 119 is also provided in the block 114 which establishes communication for the opening 115 with the exterior of the block 114, so that the fluid entering the opening 115 may freely pass through the port 119, from which it returns to the bottom of the transmission casing.

Block 114 is further provided with a passage 121 having one end in communication with the opening 113. Also in communication with the passage 121 are passages 122 and 123, these latter two passages being further interconnected by means of a channel 124 provided in the block 114. Disposed within the passage 123 is a piston 125 and a spring 126 which biases piston 125 upwardly, in the view of Figure 4. In the wall of the block 114 there is further provided a bleed port 127 for establishing communication for the passage 123 with the exterior of the block 114 so that fluid may, under certain conditions as will subsequently be explained, pass through the passage 123 and the port 127 to be thereby returned to the bottom of the transmission casing.

Block 114 is also provided with a channel 128 having the interior end portion communicating with the passage 121, while the exterior portion thereof is connected to a fluid transmitting line 129 disposed between the channel 128 and an opening 130 in a collector ring 131. As particularly shown in Figure 1, the collector ring 131 is mounted around the peripheral groove 99 in shaft 74, and is axially fixed by means of a shoulder 132 and a stop ring 133.

The collector ring 131 has an opening 134 which is connected to an accumulator 135 by means of a fluid transmitting line 136. The accumulator 135 comprises a cylinder 137 having a piston 138 therein which is normally urged to the position illustrated in Figure 5 by a spring 139. This spring 139 is chosen so as to exert sufficient bias on the piston 138 to substantially prevent its movement in opposition to the spring until the fluid pressure increases sufficiently to effect the engagement between the clutch discs 82 and 83 (as is more fully explained and claimed in the aforementioned co-pending application of McAninch and Tharpe). When the fluid pressure reaches this value, spring 139 yields to allow some of the fluid to be received within cylinder 137, whereby a gradual engagement between the clutch discs 82 and 83 is effected.

To establish the necessary fluid pressure for operating the clutch means 14 there is provided a fluid pump 141 of the positive displacement type driven by the vehicle engine. The pump 141 draws fluid through a line 142 from a sump, which may comprise the lower portion of the transmission casing, and pumps this fluid into a fluid transmitting line 143 connected to the outer end of the passage 123 in the block 114.

The operation of the mechanism of the present invention will now be described. For the purpose of explanation it will be assumed that this mechanism is disposed in a tractor having a transmission 12, connected to the tractor engine through a main clutch, the tractor being provided with a power take-off shaft 13 drivingly connected to an auxiliary implement such as a corn husker, and further assuming that the vehicle engine is stopped. When the engine is stopped, it will be obvious that the pump 141 driven thereby will also be inoperative. In this condition, the three pairs 96, 97 and 98 of Belleville washers or clutch disengaging springs will occupy their normal condition, indicated in Figure 5, and will bias the piston 77 to its most leftward position into abutment with housing 76. As the piston 77 occupies this position a surface of the groove 91 therein engages the fingers 90 of the members 89 to force these members, and the reaction plate 84 connected thereto, inwardly to the left to the position indicated in Figure 5. In this position the clutch teeth 86 on the reaction plate 84 have been moved into engagement with the clutch teeth 87 on the driven annular member 79 whereby the shaft 78 will be directly connected through the transmission 12 and the main clutch to the tractor engine. As will be understood by those skilled in the art, the driving wheels of the tractor will thereby be braked by the stationary or inoperative tractor engine.

When the engine is running and the tractor is moving, either forwardly or rearwardly depending upon the condition of transmission 12, the parts will be in a position as illustrated in Figure 4. The pump 141 will transmit fluid under pressure through the line 143, and passages 123 and 121 in the block 114. The valve 111 is then in a position illustrated in Figure 4 so that pressurized fluid is transmitted through channel 128, line 129, ring 131, groove 99 and aperture 102 to the cylinder formed by the housing 76. Piston 77 then occupies its most outward position against the bias of the Belleville washers which are, as shown in Figure 4, all in collapsed condition. It should be noted that as piston 77 moves from the position illustrated in Figure 5 to that position illustrated in Figure 4, the Belleville washers will initially assume an intermediate condition, which is shown in Figure 3. In this intermedate condition, the pair of Belleville washers 98 has collapsed, but the pairs 96 and 97 are still in their normal position. It should also be noted from Figure 3 that in this intermediate condition, the partially outward movement of the piston 77 has caused sufficient engagement between the clutch discs 82 and 83 to effect their longitudinal movement along the splines associated therewith to effect rearward movement of reaction plate 84 into its outermost position, determined by stop ring 85. In this position, the clutch teeth 86 and 87 are disengaged. As piston 77 moves from this intermediate condition to its most outward position, illustrated in Figure 4, further pressure is exerted by the piston 77 upon the clutch discs 82 and 83 which are very tightly compressed between the piston 77 and the reaction plate 84 so that the friction between the clutch discs establishes a driving connection between the shaft 74 and the driven shaft 78. The driving wheels of the tractor are then driven at a rate determined by the speed of the driving engine and the driving ratio through the transmission 12.

When it is desired to disengage the driving wheels from the transmission 12, and yet continue to operate the corn husker or other implement from the take-off shaft 13, it is only necessary for the operator of the tractor to move the lever 112 against the bias of the spring 120 to the position indicated in Figure 3, so that the opening 110 of the valve 111 interconnects the opening 115 and passage 121 in the valve block 114. Such movement relieves a portion of the fluid pressure, formerly transmitted to the piston 77, by virtue of the fact that ball 118 is moved away from valve seat 116, against the bias of spring 117, so that a portion of the fluid passes through opening 115 and port 119 and returns to the sump. In view of the reduced pressure behind the piston 77, pairs 96 and 97 of the Belleville washers (but not pair 98) will expand to their normal position, forcing pistons 77 inwardly toward housing 76, the parts assuming the position illustrated in Figures 1 and 3. It will be apparent that achievement of this condition is accomplished by correlating the relative biasing strengths of spring 117 and the pairs of Belleville washers. In other words, these biasing means are such that when valve 111 occupies the position shown in Figure 3, piston 77 is moved to the intermediate position illustrated, in which neither the friction clutch nor the positive clutch are engaged. In this condition, piston 77 no longer exerts sufficient pressure on the clutch disks 82 and 83 to effect the driving connection therebetween, whereby the connection between the driving wheels of the tractor and the transmission is broken. As long as the operator continues to hold the handle 112 in the position illustrated in Figure 3, the driving wheels of the vehicle will receive no torque, the corn husker, however, being continually operated from the power take-off shaft 13. It will also be seen that should the pressure in the system fall, for any reason, below the value necessary to keep pairs 96 and 97 of Belleville washers collapsed, these washers will expand to the position shown in Figure 3 whereby piston 77 will be moved sufficiently to effect an interruption in the driving connection between clutch discs 82 and 83.

When it is desired to again move the tractor, the operator merely releases the lever 112, spring 120 rotating the lever to the position illustrated in Figure 4, whereby the full pressure delivered by pump 141 is again transmitted through line 129. Piston 77 will, therefore, as previously described, move to effect a driving engagement between clutch disks 82 and 83 to complete the driving connection between the transmission 12 and the driven shaft 78, whereby torque is once again supplied to the driving wheels of the tractor.

As previously described, when the tractor is being driven forwardly or rearwardly, depending upon the condition of the transmission 12, the mechanism of the present invention occupies the position illustrated in Figure 4. Should the tractor engine stop for any reason, pump 141 would no longer deliver any pressure to the system and normal fluid flow through valve block 114 will cease. The pairs 96, 97 and 98 of Belleville washers, and the spring 139 of the accumulator 135, would thereby immediately become operative to tend to reverse the normal flow of fluid through the line 129. Piston 125 is maintained in the position illustrated in Figure 4 by virtue of fluid flow from pump 141 through the passages of the block 114. When the pump 141 becomes inoperative, therefore, and this fluid flow ceases, spring 126 moves piston 125 upwardly. The length of piston 125 is chosen so that it will simultaneously just cover port 127 and the opening interconnecting passages 121 and 123. (Therefore, when the piston 125 is raised sufficiently to open port 127, the passage 121 is closed; likewise, when the piston 125 moves downwardly to interconnect the passages 121 and 123, the port 127 is closed.) As spring 126, therefore, effects movement of the piston 125 toward the position shown in Figure 5, bleed port 127 is opened. Inasmuch as the Belleville washers and the spring 139 effect a reversal of fluid flow in the valve block 114, this fluid passes through channel 128, passages 121 and 122, channel 124, passage 123 and bleed port 127, from which it returns to the sump. As the Belleville washers expand to force piston 77 inwardly of housing 76, an edge of groove 91 will, as previously explained, carry members 89 and reaction plate 84 connected thereto toward the interior of the housing 76 so that clutch teeth 86 on reaction plate 84 are carried into cooperative relationship with teeth 87 on member 79. It will, therefore, be apparent that driven clutch member 79 will be braked, and the driving wheels of the tractor connected thereto will be prohibited from further movement.

It will be obvious to those skilled in the art that the mechanism of the present invention comprises a clutching mechanism capable of transmitting substantial torque loads. It is further obvious that this mechanism provides for braking the vehicle driving wheels when the vehicle motor is stopped either deliberately or inadvertently, and also when fluid flow from the source of pressure fails for any other reason. Furthermore, this mechanism provides for interrupting the connection between the driving wheels of the vehicle and the transmission at any time the operator desires, or at any time fluid pressure falls below a predetermined value. Also, it will be seen that the positive clutching means provided are always disengaged before engagement of the friction clutch employed herein. It will further be seen that all of these features are accomplished with mechanism which is relatively simple and inexpensive, yet sturdy and dependable in operation.

While we have described our invention in connection with one specific embodiment thereof, it is to be understood that this is by way of illustration and not by way of limitation, and the scope of our invention is defined solely by the appended claims which should be construed as broadly as the prior art will permit.

We claim:

1. In a device of the class described, the combination which comprises driving and driven means, movable means, a friction clutch for interconnecting said driving and driven means only when said movable means occupies a first position, a positive clutch for interconnecting said driving and driven means only when said movable means occupies a second position, and means constantly urging said movable means toward said second position comprising first and second biasing means adapted and arranged to effect movement of said movable means from said first or second positions to a position intermediate said first and second positions when a predetermined force in opposition to said urging means is applied to said movable means and adapted to permit movement of said movable means from said intermediate position to said first position when a greater than said predetermined force is applied to said movable means in opposition to said bias.

2. In a device of the class described, the combination which comprises driving and driven means, movable means, a friction clutch for interconnecting said driving and driven means only when said movable means occupies a first position, a positive clutch for interconnecting said driving and driven means only when said movable means occupies a second position, and means constantly urging said movable means toward said second position comprising first biasing means adapted and arranged to permit movement of said movable means away from said second position when a predetermined force in opposition to said urging means is applied to said movable means and second biasing means adapted and arranged to effect movement of said movable means to a position intermediate said first and second positions when said predetermined force is applied to said movable means.

3. In a device of the class described, the combination which comprises driving and driven means, movable means, a friction clutch for interconnecting said driving and driven means only when said movable means occupies a first position, a positive clutch for interconnecting said driving and driven means only when said movable means occupies a second position, and means constantly urging said movable means toward said second position comprising first biasing means adapted and arranged to permit movement of said movable means away from said second position when a predetermined force in opposition to said urging means is applied to said movable means and second biasing means adapted and arranged to effect movement of said movable means to a position intermediate said first and second positions when said predetermined force is applied to said movable means, but permitting movement of said movable means to said first position when a second force greater than said predetermined force is applied to said movable means in opposition to said urging means.

4. In a device of the class described, the combination comprising driving and driven means, movable means positionable consecutively in first, intermediate, and second positions, a friction clutch interconnecting said driving and driven means only when said movable means occupies said first position, a positive clutch for interconnecting said driving and driven means only when said movable means is in said second position, neither of said clutches being engaged when said movable means is in said intermediate position, means constantly urging said movable means toward said second position comprising first biasing means adapted and arranged to permit movement of said movable means away from said second position when a predetermined force in opposition to said urging means is applied to said movable means and second biasing means adapted and arranged to cause said movable means to move to said intermediate position when said predetermined force is applied.

5. In a device of the class described, the combination comprising driving and driven means, movable means positionable consecutively in first, intermediate, and second positions; a friction clutch interconnecting said driving and driven means only when said movable means are in said first position, a positive clutch for interconnecting said driven and driving means only when said movable means are in second position, neither of said clutches being engaged when said movable means are in said intermediate position, means constantly urging said movable means toward said second position comprising first biasing means adapted and arranged to permit movement of said movable means away from said second position when a predetermined force in opposition to said urging means is applied to said movable means and second biasing means adapted and arranged to cause said movable means to move to said intermediate position when said predetermined force is applied, but permitting movement of said movable means to said first position when a second force greater than said predetermined force is applied to said movable means in opposition to said urging means.

6. In a device of the class described, the combination comprising driving and driven means, a friction clutch, a positive clutch; means movable to a first position for engaging said friction clutch whereby a driving connection is established between said driving and driven means, and movable to a second position for engaging said positive clutch to effect a driving connection between said driving and driven means, and movable to an intermediate position in which both said friction and positive clutches are disengaged; means constantly urging said movable means toward said second position comprising biasing means adapted and arranged to permit movement of said movable means from said second position to said intermediate position when a predetermined force in opposition to said urging means is applied to said movable means, and means effecting engagement of said positive clutch when said movable means moves to said second position comprising a member having a positive connection to said positive clutch and a lost motion connection to said movable means.

7. In a device of the class described, the combination comprising driving and driven means, a friction clutch, a positive clutch; means movable to a first position for engaging said friction clutch whereby a driving connection is established between said driving and driven means, and movable to a second position for engaging said positive clutch to effect a driving connection between said driving and driven means, and movable to an intermediate position in which both said friction and positive clutches are disengaged; means constantly urging said movable means toward said second position comprising biasing means adapted and arranged to permit movement of said movable means from said first or second positions to said intermediate positions when a predetermined force in opposition to said urging means is applied to said movable means and further adapted and arranged to permit movement of said movable means from said intermediate position to said first position when a second force greater than said predetermined force is applied to said movable means in opposition to said urging means, and means effecting engagement of said positive clutch when said movable means moves to said second position comprising a member having a positive connection to said positive clutch and a lost motion connection to said movable means.

8. In a clutch, the combination comprising driving means including a housing, a plurality of driving clutch discs on said housing and movable axially thereof, a reaction plate on said housing and movable axially thereof, stop means on said housing determining the limit of movement of said reaction plate in one direction, driven means, a plurality of driven clutch means on said driven means axially thereof and interleaved with said driving clutch discs, movable means movable toward said stop means to a first position to effect driving engagement between said clutch discs, means biasing said movable means away from said stop means to a second position, means for moving said reaction plate away from said stop means when said movable means approaches said second position comprising a member positively interconnecting said reaction plate and movable means when said movable means approaches said second position whereby said reaction plate is positively moved away from said stop means, and means on said reaction plate and driven means for limiting the relative rotational movement therebetween when said reaction plate is moved a predetermined distance away from said stop means.

9. In a clutch, the combination comprising driving means including a housing, a plurality of driving clutch discs on said housing and movable axially thereof, a reaction plate on said housing and movable axially thereof, stop means on said housing determining the limit of movement of said reaction plate in one direction, driven means, a plurality of driven clutch means thereon movable axially thereof and interleaved with said driving clutch discs, movable means movable toward said stop means to a first position to effect driving engagement between said clutch discs, means biasing said movable means away from said stop means to a second position, means for moving said reaction plate away from said stop means when said movable means approaches said second position, and means for limiting the relative rotational movement between said driving and driven means when said reaction plate is moved a predetermined distance away from said stop means.

10. In a device of the class described, driving and driven means, a friction clutch adapted when engaged to effect a driving connection between said driving and driven means, a positive clutch adapted when engaged to effect a driving connection between said driving and driven means, a fluid pressure actuated piston, a source of fluid pressure, fluid pressure transmitting means interconnecting said source and piston, biasing means constantly urging said piston toward one position whereby when said source of pressure is inoperative said piston will occupy a first position and whereby when intermediate and high pressures are supplied to said piston, said piston will occupy intermediate and second positions respectively, and means interconnecting said piston and clutch means adapted and arranged to effect engagement of said positive clutch when said piston occupies said first position only and to effect engagement of said friction clutch when said piston occupies said second position only and to effect disengagement of both said friction and positive clutches when said piston occupies said intermediate position.

11. The combination defined in claim 10 in which manually operable means are provided for selectively effecting the application of either said intermediate or said high pressure to said piston, whereby said piston may be positionable in response to operation of said manual means either in its intermediate position in which no clutch means is engaged or its second position in which said friction clutch means is engaged.

12. The combination defined in claim 11 in which means are provided for effecting passage of fluid over said friction clutch means to effect cooling thereof when said high pressure is applied to said piston.

13. In a mechanism of the class described, the combination comprising driving means including a housing, a plurality of driving clutch discs on said housing and movable axially thereof, a reaction plate on said housing and movable axially thereof, a stop means on said housing determining the limit of movement of said reaction plate in one direction, driven means, a plurality of driven clutch means on said driven means and movable axially thereof and interleaved with said driving clutch discs, a source of fluid pressure, a piston within said housing movable toward said stop means to a first position to effect driving engagement between said clutch discs, means biasing said piston away from said stop means to a second position, means interconnecting said piston and said source of fluid pressure whereby forces in opposition to the force of said biasing means may be applied to said piston, means for moving said reaction plate away from said stop means when said piston approaches said second position, and means for limiting the relative rotational movement between said driving and driven means when said reaction plate is moved a predetermined distance away from said stop means.

14. The mechanism defined in claim 13 in which said means for moving said reaction plate away from said stop means comprises a member positively interconnecting said piston and said reaction plate when said piston approaches said second position whereby said reaction plate is positively moved away from said stop means.

15. In a fluid pressure operated system, a source of fluid pressure, a first piston, means for biasing said first piston toward one position, means for interconnecting said source and first piston to effect the application of force to said first piston in a direction opposite to the direction of the force supplied thereto by said biasing means whereby said first piston is moved to a second position against the bias of said biasing means when said source of fluid pressure is operative; said last mentioned means comprising fluid transmitting lines, a valve block having passages therein through which fluid flow interconnecting said lines, a port in said block for communicating at least some of said passages with the exterior of said block, a second piston reciprocable within one of said passages and movable into a blocking position with respect to said port, a spring, said second piston having said spring disposed with respect thereto so as to move the second piston into a position wherein said port is unblocked and disposed so that said fluid pressure from said source is applied thereto in opposition to the force of said spring and the second piston being thereby effective to prevent fluid flow through said port when said source of fluid pressure is operative but to permit fluid flow through said port when said source of fluid pressure is inoperative whereby fluid flowing through said lines and block in response to movement of said first piston toward said one position is permitted to flow through said port to the exterior of said block.

16. In a fluid pressure operated system, a source of fluid pressure, a first piston, means for biasing said first piston toward one position, means for interconnecting said source and first piston to effect the application of force to said first piston in a direction opposite to the direction of the force supplied thereto by said biasing means whereby said first piston is moved to a second position against the bias of said biasing means when said source of fluid pressure is operative; said last mentioned means comprising fluid transmitting lines, a valve block having passages therein through which fluid may flow interconnecting said lines, a port in said block for communicating at least some of said passages with the exterior of said block, a second piston disposed within said block for preventing fluid flow through said port, a spring within said block biasing said second piston toward an inoperative position, and means for applying fluid pressure from said source to said second piston in opposition to the force applied thereto by said spring when said source is operative whereby said second piston is moved against the bias of said spring and fluid flow through said port is prevented when said source of fluid pressure is operative, said spring being adapted to effect movement of said second piston to an inoperative position when said source of fluid pressure is inoperative whereby fluid flowing through said lines and block in response to movement of said first piston toward said one position is permitted to flow through said port to the exterior of said block.

17. In a device of the class described, the combination comprising driving and driven means, friction clutch means for interconnecting said driving and driven means, positive clutch means for interconnecting said driving and driven means, a cylinder, a fluid pressure actuated piston in said cylinder movable to a first position when a high pressure is applied thereto in which only said friction clutch is engaged and movable to an intermediate position when an intermediate pressure is applied thereto in which neither clutch is engaged and movable to a third position when no pressure is applied thereto in which only said positive clutch is engaged, a fluid pressure system including a source of fluid pressure connected to said cylinder whereby at least a portion of said cylinder is maintained full of fluid under pressure at all times during which said source of fluid pressure is operative, and manually controlled means disposed in said system adapted and arranged to effect at will the application to said piston of either a high or an intermediate fluid pressure whereby said piston may be moved from said intermediate position to said first position without delay.

18. In a fluid pressure operated system, a source of fluid pressure, a first piston, means for biasing said first piston toward one position, means for interconnecting said source and first piston to effect the application of force to said first piston in a direction opposite to the direction of the force supplied thereto by said biasing means whereby said first piston is moved to a second position against the bias of said biasing means when said source of fluid pressure is operative; said last-mentioned means comprising fluid transmitting lines, a valve block having passages therein through which fluid may flow interconnecting said lines, a port in said block for communicating at least one of said passages with the exterior of said block, a second piston reciprocable within one of said passages and movable into a blocking position with respect to said port, a spring, said second piston having said spring disposed with respect thereto so as to tend to move the second piston into a position wherein said port is unblocked and disposed so that said fluid pressure from said source is applied thereto in opposition to said spring and the second piston being thereby effective to prevent fluid flow through said port when said source of fluid pressure causes fluid flow through said valve block passages but to permit fluid flow through said port when said source of fluid pressure ceases to cause fluid flow through said valve block passages whereby fluid flowing through said lines and block in response to movement of said first piston toward said one position is permitted to flow through said port to the exterior of said block.

References Cited in the file of this patent

UNITED STATES PATENTS

| | | |
|---|---|---|
| 1,739,946 | Carhart | Dec. 17, 1929 |
| 1,805,081 | Drkal | May 12, 1931 |
| 1,970,998 | Ferris | Aug. 21, 1934 |
| 1,987,426 | Warren | Jan. 8, 1935 |
| 2,151,153 | Rode et al. | Mar. 21, 1939 |
| 2,348,763 | Syrovy et al. | May 16, 1944 |
| 2,475,997 | Smith | July 12, 1949 |
| 2,505,450 | Wemp | Apr. 25, 1950 |
| 2,695,532 | De Vlieg | Nov. 30, 1954 |